Jan. 2, 1968   J. M. TYRNER   3,360,823
FLAT FILM DIE

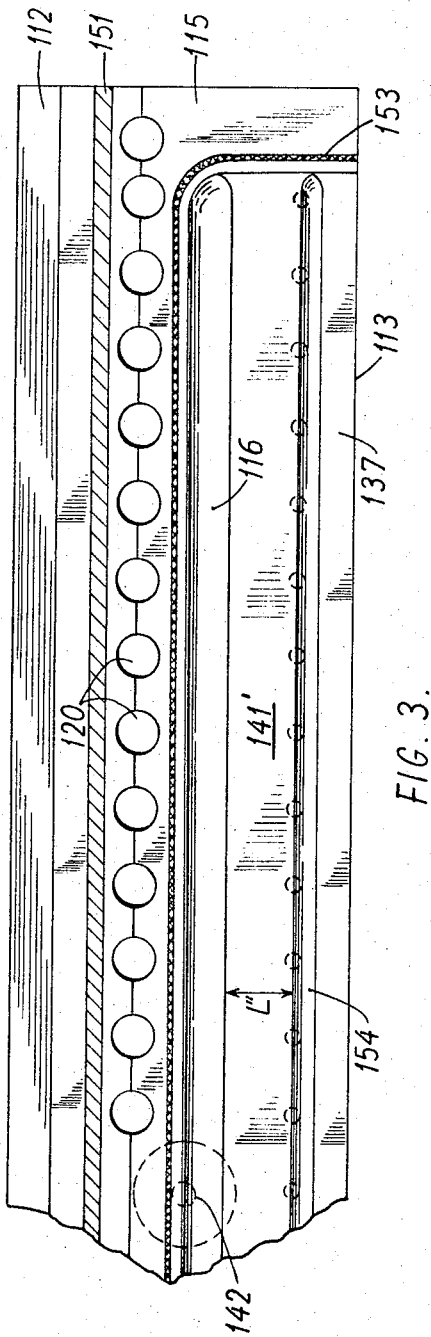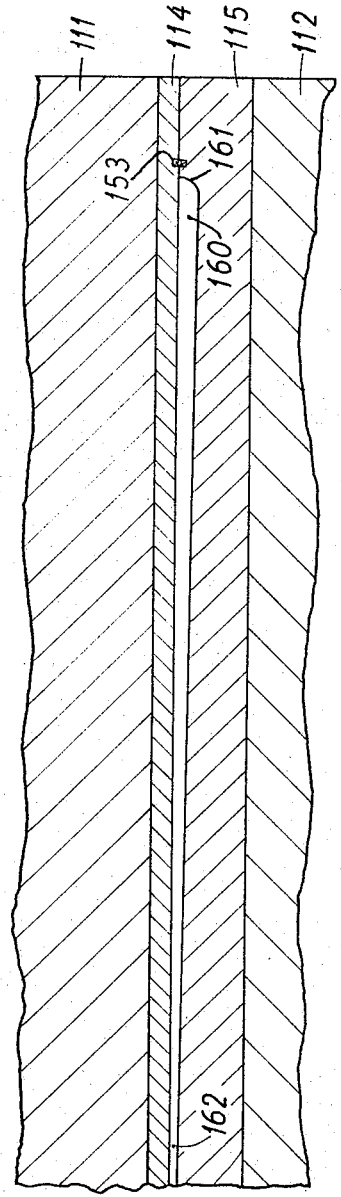

Filed March 7, 1966   3 Sheets-Sheet 3

INVENTOR.
JOSEPH M. TYRNER
BY
AGENT

# United States Patent Office 3,360,823
Patented Jan. 2, 1968

3,360,823
FLAT FILM DIE
Joseph M. Tyrner, Brookside, N.J., assignor to Allied Chemical Corporation, New York, N.Y., a corporation of New York
Filed Mar. 7, 1966, Ser. No. 532,280
6 Claims. (Cl. 18—12)

ABSTRACT OF THE DISCLOSURE

This application is directed to film extrusion dies which achieve an approximately equal pressure distribution across the length of the extrusion gap of the die. This equal pressure distribution is achieved by using an extrudate distribution passage which is parallel to the pressure equalizing channel located downstream therefrom and by varying the width of the passageway which connects the extrudate distribution passage with the pressure equalizing channel, rather than varying the length of this passage as in the prior art.

---

This application is a continuation-in-part of U.S. application Ser. No. 332,514, filed Dec. 23, 1963, now Patent No. 3,241,183, and pertains to dies of the type used to extrude flat films from molten feed material such as plastic.

U.S. application Ser. No. 332,514, referred to above, deals with film extrusion dies of the type known as "coat hanger" dies. The term "coat hanger" is used to refer to such dies because of the curve formed by their slanted extrudate distribution passages, which resemble the downwardly angled shoulder portions of a coat hanger.

One of the characteristics which a flat film die should possess is an equal pressure distribution across the extrusion gap, i.e. the pressure at a given point near an end of the extrusion gap should equal the pressure at a given point near the center. This characteristic must be present in order to achieve a film of uniform thickness. The "coat hanger" type of die referred to above achieves this characteristic by varying the distance between the extrudate distribution passage and a pressure equalizing channel, which is adjacent to and communicates with the extrusion gap, inversely with the distance from the central feed passage. Thus, adjacent the central feed passage where the pressure in the extrudate is high there is a relatively large distance between the extrudate distribution passage and the pressure equalizing channel over which the extrudate must flow, and at the end of the die where the pressure in the extrudate is lower, there is a relatively small distance between the extrudate distribution passage and the pressure equalizing channel over which the extrudate must flow. Ideally, the extrudate distribution passage should be machined so that the distance between the extrudate distribution passage and the pressure equalizing channel is varied in such a manner as to achieve a constant pressure across the length of the extrusion gap. In practice, however, for economic reasons, the extrudate distribution passage is machined in a slanted straight line which yields only a very rough approximation of an equal pressure distribution across the extrusion gap. For example, by use of the slanted straight line extrudate distribution passage, the passageway between the extrudate distribution passage and the pressure equalizing channel can be as much as 100% longer than the theoretical length required to yield an equal pressure distribution across the extrusion gap. Obviously this deviation from theoretical length results in an undue variation in pressure across the extrusion gap, necessitating much extrusion gap width adjustment by trial and error and a consequently long start-up time.

It has now been found that instead of using the slanted extrudate distribution passages of the "coat hanger" die, a level extrudate distribution passage can be used if the width of the passageway between the extrudate distribution passage and the pressure equalizing channel is varied in direct proportion to the distance from the central feed passage. Even this direct proportion variation of the width of the passageway yields only a straight line approximation of an equal pressure distribution curve (the straight line again being desirable for economic reasons). However, it has been found that the approximation yielded by this latter die results in a variation of only about 10% from the theoretical depth of the passageway over the length of the extrusion gap, as compared to the up to 100% variation from theoretical passageway length of the "coat hanger" type die. Thus only a small amount of trial and error extrusion gap width adjustment and consequently a short start-up period is necessary with this latter type of die.

Another advantage of the die of this invention is that, due to its above-mentioned closer approximation of theoretical conditions, wider films (for example 100 inches or more) can be extruded much more easily than with the "coat hanger" type of die.

Other advantages of this invention will be apparent from the following detailed description thereof taken in connection with the accompanying drawings in which FIGURES 1, 2 and 4 are illustrative of the prior art "coat hanger" type of die and have been included for purposes of comparison with the level extrudate distribution passage type of die of this invention. In the drawings:

FIGURE 3 is a partial elevational view of a portion of the die of FIGURE 1 taken on a line 2—2 of FIGURE 1, wherein the die illustrated is of the present level distribution passage type.

FIGURE 5 is a cross-sectional view taken on a line 4—4 through FIGURE 1, illustrating the tapering passageway of the present level distribution type of die.

Figures 1, 2:
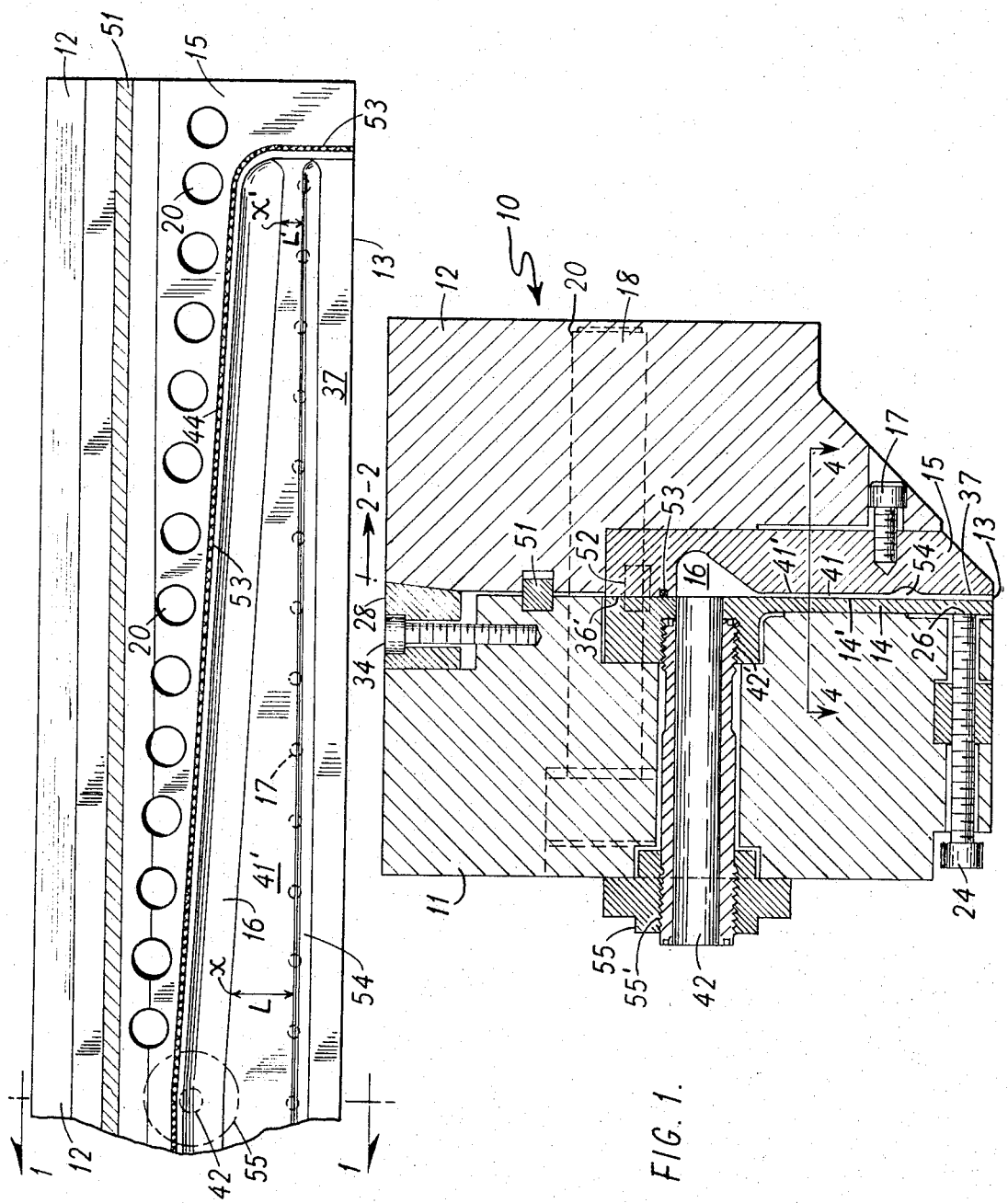
FIGURE 1 is a vertical section of a flat film extrusion die which, due to the point at which the section is taken, can be illustrative either of the "coat hanger" type or the present level extrudate distribution passage type of die.
FIGURE 2 is a partial elevational view on a reduced scale of a portion of the die of FIGURE 1 taken on a line 2—2 of FIGURE 1, wherein the die illustrated is of the "coat hanger" type. This figure is illustrative of the prior art.

Referring more particularly to FIGURE 1, reference numeral 42 indicates a central feed passage through which molten extrude such as plastic is supplied. Reference numeral 16 indicates the extrudate distribution passage by means of which the molten extrudate is distributed along the length of the die. Reference numeral 41 indicates the passageway followed by the molten extrudate as it flows out of extrudate distribution passage 16. Passageway 41 is defined by inner wall 14' of flat flexible insert 14 and by upper land 41' of die cavity insert 15. Passageway 41 emerges into a pressure equalizing channel 54 formed in die cavity insert 15. This pressure equalizing channel is positioned just above the upper edge of lower land 37 and extends the full length of the extrusion gap. The bottom edge of lower land 37 forms one lip of extrusion gap 13, the other lip being formed by the lower edge of flat flexible insert 14.

Flat flexible insert 14 is positioned in supporting block 11 while die cavity insert 15 is positioned by means of screws 17 in supporting block 12. The inner end of central feed passage 42 is secured to flat flexible insert 14 by means of threads 42', while its outer end is positioned by means of threads in collar 55 at 55'. Keys 51 and 52 are used to assure alignment, respectively, of the supporting blocks 11, 12, and inserts 14, 15. A wedge 28 between supporting blocks 11 and 12 can be adjusted by means of screws 34 so as to adjust the relative position of supporting blocks 11 and 12 with respect to inserts 14 and 15. Clamping bolts 18 in threaded holes 20 are used to maintain supporting blocks 11 and 12 in clamped engagement. Reference numeral 24 indicates a screw bearing against flat flexible insert 14 at a point 26 adjacent extrusion gap 13. Such screws are positioned at regular intervals along the extent of extrusion gap 13. By means of adjustment of these screws fine adjustment of the width of extrusion gap 13 can be achieved in order to compensate for any irregularities in pressure which may exist over the length of the extrusion gap.

With respect to FIGURE 2, which is illustrative of the prior art, reference numerals 12 and 15 again indicate the supporting block and die cavity insert, the latter being held in place by screws 17. Reference numeral 20 indicates the holes into which clamping bolts 18 (see FIG. 1) are threaded. Reference numeral 53 indicates a sealing gasket positioned in slot 44 in the die cavity insert 15. Reference numerals 42 and 55 indicate ghost lines which have been superimposed upon the drawing to indicate the relative position of feed passage 42 and collar 55. Reference numeral 16 indicates the extrudate distribution passage. Reference numeral 41' indicates the upper land over which the extrudate passes as it flows to pressure equalizing channel 54. Upper land 41' varies in length inversely with the distance from central feed passage 42. Thus at point $x$ where the pressure of the extrudate is relatively high the extrudate must traverse a relatively long length L of upper land 41' while at point $x'$ where the pressure of the extrudate is relatively low the extrudate need only traverse a short length L' of upper land 41'. In this manner a very rough approximation of equal pressure distribution along the extrusion gap 13 is achieved. In the interest of clarity, key 52 has not been shown on this figure.

With respect to FIGURE 3, reference numeral 116 indicates the level extrudate distribution passage through which the molten extrudate is distributed from central feed passage 142, the position of which has been superimposed upon this drawing by the use of ghost lines. Reference numerals 120 indicate the holes into which clamping bolts of the type shown at 18 on FIGURE 1 are threaded. Reference numeral 141' indicates an upper land surface corresponding to upper land 41' in FIGURES 1 and 2. Upper land 141' is of uniform length L'' over the entire extent of the extrusion gap. Reference numeral 154 indicates a pressure equalizing channel into which the extrudate flows over upper land 141'. The extrudate emerges from pressure equalizing channel 154, flows over lower land 137, and emerges from extrusion gap 113.

Figure 4:
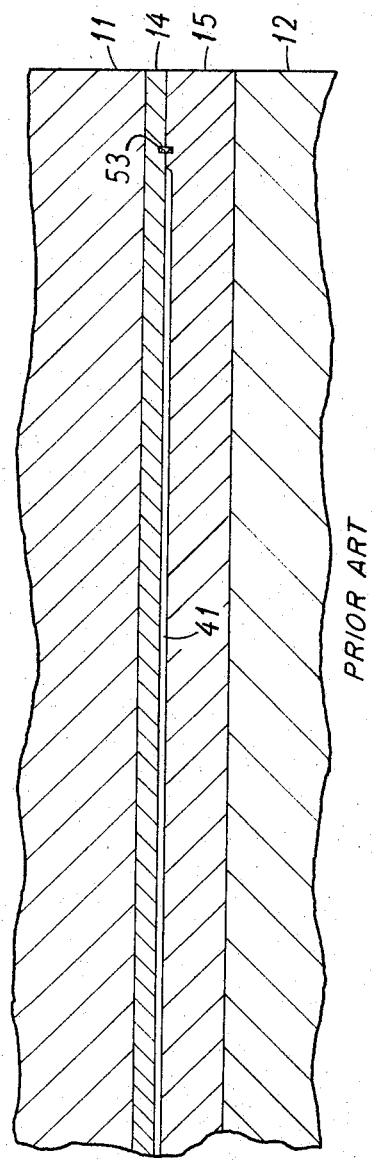
FIGURE 4 is a partial cross-sectional view taken along line 4—4 of FIGURE 1, illustrating the uniform thickness passageway characteristic of a "coat hanger" type die. This figure is illustrative of the prior art.

Referring now more particularly to FIGURE 4, which is illustrative of the prior art, reference numerals 11 and 12 indicate the supporting blocks. Reference numerals 14 and 15 indicate respectively the flat flexible insert and the die cavity insert. Reference numeral 41 indicates the passageway followed by the extrudate flowing between extrudate distribution passage 16 and pressure equalizing channel 54. Passageway 41 is of equal width throughout its length as is characteristic of "coat hanger" type dies.

Referring more particularly to FIGURE 5, reference numerals 111 and 112 indicate supporting blocks corresponding to 11 and 12 on FIGURE 1. Reference numerals 114 and 115 indicate respectively the flat flexible insert and the die cavity insert corresponding to 14 and 15 on FIGURE 1. Reference numeral 160 indicates the tapering-width passageway between distribution passage 116 and pressure equalizing channel 154 which is the critical feature of this invention. Passageway 160 varies in width from a narrow point 162 adjacent central feed passage 142 to a wide point at its end 161. This variation in width is in direct proportion to the distance from central feed passage 142.

It will be appreciated that the die of this invention is provided with usual channels for heating elements, thermocouple connections, eye bolts or other members to facilitate handling, and other such conventional components. In the interest of simplifying the drawings, such details have been omitted.

The extrusion die of the present invention is designed for extruding films of plastic under any desired pressure, including pressures of the order of from 1,000 to 10,000 p.s.i.g. The film is extruded, i.e. leaves the exit gap, at approximately atmospheric pressure.

It will be noted that the present invention provides an extrusion die designed to prevent differential expansion or contraction of the lips of the exit gap. Since, in this invention, the ends of the flat flexible insert 14 and die cavity insert 15 are not restrained, they are free to expand or contract with temperature changes. Hence the exit gap once adjusted remains uniform, i.e., is not distorted due to differential contraction or expansion. Any expansion or contraction which takes place is the same for both members defining the lips of the exit gap because both members are constructed of the same material. Because distortion of the exit gap is substantially reduced, if not completely eliminated, better control of the thickness of the film is achieved.

Moreover, in the structure of this invention only the flat flexible insert 14 and the die cavity insert 15 need be made from corosion-resisting alloys having machinability, such, for example, as nickel alloys, e.g., "Incoloy," an alloy consisting of about 70% by weight of nickel, 20% chromium and 10% iron. The heavy structural parts 11 and 12 can be made of any desired inexpensive material such, for example, as steel.

The flexible insert 14 and die cavity insert 15 being replaceable, one and the same die can be used to produce different web widths requiring different die cavity conformations. The position of supporting blocks 11 and 12 can be adjusted relative to flat flexible insert 14 and die cavity insert 15 by means of wedge 28 and screws 34 in order to adjust for surface irregularities between various sets of inserts.

While the invention has been described with particular reference to specific embodiments it is to be understood that it is not to be limited thereto but is to be construed broadly and restricted solely by the scope of the appended claims.

I claim:
1. A flat film extrusion die comprising feed passage means, extrudate distribution passage means communicating with said feed passage means and extending therefrom into passageway means connecting said extrudate distribution passage means with pressure equalizing channel means, said passageway means varying in width from a minimum width adjacent said feed passage means to a maximum width adjacent the end of said extrudate distribution passage means, and extrusion gap means communicating with said pressure equalizing channel means, said varying width passageway means resulting in a close approximation of equal pressure distribution in the extrudate across the length of said extrusion gap means.

2. The die of claim 1 wherein said extrudate distribution passage means and said pressure equalizing channel means are substantially parallel.

3. The die of claim 2 further comprising at least two supporting block means supporting insert means, said insert means defining said extrudate distribution passage means, said passageway means, said pressure equalizing channel means, and said extrusion gap means.

4. The die of claim 3 further comprising wedge means for adjusting the position of said supporting block means with respect to said insert means, and adjustment means for adjusting the width of the extrusion gap.

5. The die of claim 4 wherein said wedge means are positioned between said supporting block means at the end of the die opposite said extrusion gap means.

6. The die of claim 4 wherein one of said insert means is flexible and said adjustment means are screws which bear against and flex the flexible insert means adjacent the extrusion gap.

References Cited

UNITED STATES PATENTS

| | | | |
|---|---|---|---|
| 2,923,971 | 2/1960 | Nelson | 18—12 |
| 3,030,660 | 4/1962 | Gallant | 18—12 |
| 3,085,286 | 4/1963 | Van Riper | 18—12 |
| 3,142,090 | 7/1964 | Hoffman et al. | 18—12 |

FOREIGN PATENTS

| | | |
|---|---|---|
| 849,462 | 9/1960 | Great Britain. |
| 626,815 | 10/1961 | Italy. |
| 1,125,146 | 3/1962 | Germany. |
| 645,055 | 7/1962 | Canada. |

WILLIAM J. STEPHENSON, *Primary Examiner.*